United States Patent [19]

Erickson

[11] Patent Number: 4,709,889

[45] Date of Patent: Dec. 1, 1987

[54] WIRE CLIP

[75] Inventor: David A. Erickson, Hinsdale, Ill.

[73] Assignee: Illinois Tool Works Inc., Chicago, Ill.

[21] Appl. No.: 900,806

[22] Filed: Aug. 27, 1986

[51] Int. Cl.⁴ .................... F16L 3/08

[52] U.S. Cl. .................... 248/74.5; 248/74.3

[58] Field of Search .................... 248/74.5, 74.1-74.4, 248/68.1, 67.5, 71, 60, 65, 62, 49, 225.1, 500; 411/539-541, 537, 538, 522; 403/344; 174/40 CC

[56] References Cited

U.S. PATENT DOCUMENTS

| | | | |
|---|---|---|---|
| 479,221 | 7/1892 | Long | 403/344 |
| 748,385 | 12/1903 | Lester | 403/344 |
| 4,153,228 | 5/1979 | Delserro | 248/74.3 |
| 4,524,936 | 6/1985 | Hurtubise | 248/68.1 |
| 4,535,960 | 8/1985 | Downing | 248/74.5 |

FOREIGN PATENT DOCUMENTS

| | | | |
|---|---|---|---|
| 722084 | 1/1955 | United Kingdom | 248/68.1 |

*Primary Examiner*—Reinaldo P. Machado
*Assistant Examiner*—A. Chin Shue
*Attorney, Agent, or Firm*—Donald D. Mondul; Thomas W. Buckman

[57] ABSTRACT

A wire clip is constructed as a one piece flexible elongate plastic molded strip having a central loop-shaped wire retaining portion and an attachment means for fastening its two ends in unison to a workpiece surface. Each end has a slot extending crosswise to the length of the elongate plastic molded strip; the open end of the two slots face in opposite directions. The ends are assembled together with their slots in alignment. The two ends are formed with slanting complementary surfaces which mate together to provide a sliding wedge action as a fastening pin is driven therethrough.

1 Claim, 9 Drawing Figures

14 12 10 26 36 18 16 24 34 20 30 32

10
14
20
36
26
18
34
3
3
30
32
24
16
12

14
12
10
26
36
18
16
24
34
20
30
32

24
16
12

14
10
40

30
32

26
14
36
40
18
30
16
34
20
32
24
22

50
52
53
66
8
8
56
64

50
52
53
68
66
56
64
54
60
62

50
52
56
66
64
68
53
60
62
54

50
52

64
60
56
53
68

WIRE CLIP

SUMMARY OF THE INVENTION

A wire clip constructed as a one-piece flexible elongate plastic molded strip having a loop-shaped wire retaining portion and having attachment means for securing to a workpiece surface. The attachment means includes a slot formed through the elongate strip between the lower workpiece engage surface and an upper surface. To provide an improved holding force on the elongate strip, the plane of the upper surface of the elongate strip is slanted lengthwise of the slot at an acute angle relative to the plane of the lower workpiece engaging surface.

DESCRIPTION OF DRAWING

For a better understanding of this invention, reference may be made to the accompanying drawing, in which.

DESCRIPTION OF PREFERRED EMBODIMENT

Figure 1:
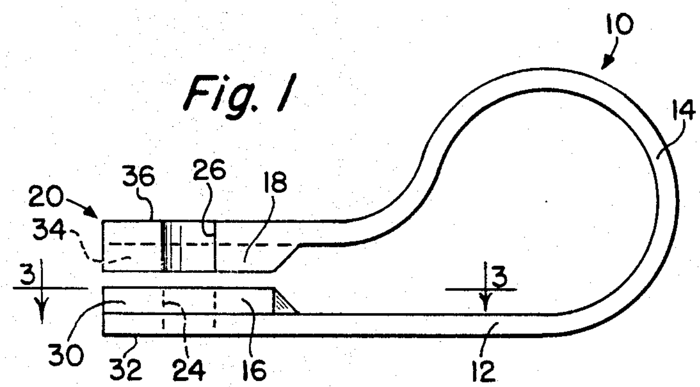
FIG. 1 is a side elevational view of the preferred embodiment of this invention.
Figure 2:
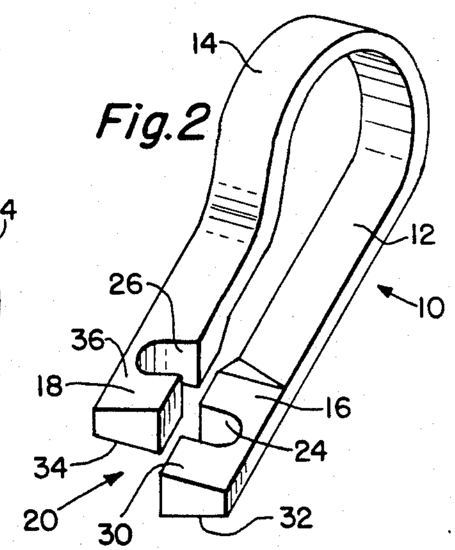
FIG. 2 is a front perspective view of the preferred embodiment.
Figure 3:
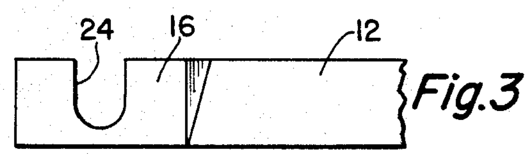
FIG. 3 is a partial top plan view of the lower base portion of the clip illustrated in FIG. 1 as indicated by arrows 3—3.

Referring to FIGS. 1 and 2, there is depicted a wire clip 10. Wire clip 10 is molded of plastic into a one-piece flexible strip 12 having a central wire retaining portion 14 and a pair of end portions 16 and 18. The heart of this invention resides in an attachment means 20 for fastening the two ends 16 and 18 together in unison onto a workpiece surface 22 (FIG. 5).

Attachment means 20 includes a pair of slots 24 and 26 which are formed in the respective ends 16 and 18, respectively. Both slots 24 amd 26 extend crosswise to the lengthwise direction of elongate strip 14 and they open in opposite directions as depicted in FIG. 2. As depicted in FIG. 5, the upper face 30 of end portion 16 is formed at an acute angle to the lower workpiece engaging surface 32. Upper surface 30 has an angled formation in the direction of slot 24 to provide a thickened section at the open end of slot 24. Likewise, lower surface 34 on end termination 18 extends at an acute angle to upper surface 36, where the lower slanting surface 34 slopes in the direction of slot 26 to provide a thickened end portion at its open end.

Figure 4:
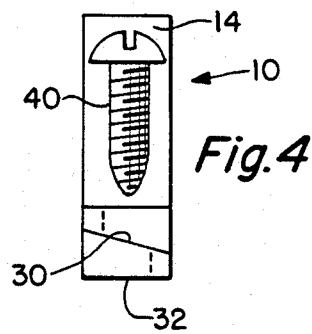
FIG. 4 is a side elevational view taken from the left side of FIG. 1 with the end portions positioned together in sliding contact and with the addition of a threaded screw depicted prior to being inserted in the aligned slots.
Figure 5:
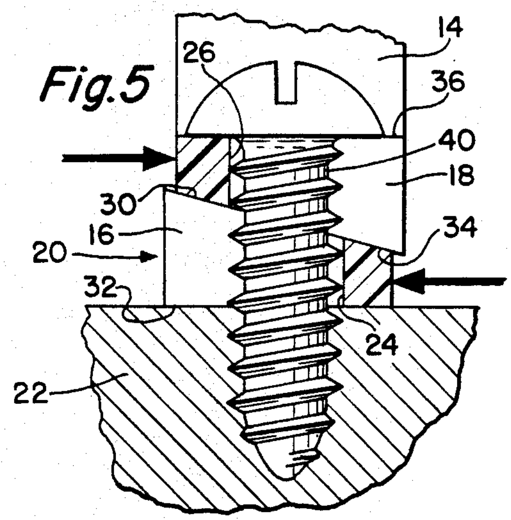
FIG. 5 is an enlarged cross sectional view depicting the two slotted end portions fastened together by a threaded screw whose pointed end has been threaded into a workpiece surface.
Figure 7:
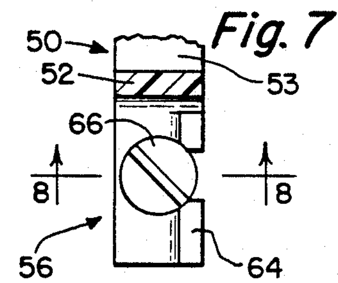
FIG. 7 is a partial top elevational view showing the attachment portion of FIG. 6.

By referring to FIGS. 4 and 5, it will be appreciated that the two slanting surfaces 30 and 34 form complementary angles to each other. In the preferred embodiment they are depicted as each having a 45° angle relative to surfaces 32 and 36.

In attaching wire clip 10, the two end portions 16 and 18 are positioned together with their slots 24 and 26 in alignment. A fastener, such as threaded screw 40, is then inserted through the aligned slots 24 and 26 and the entire clip is located at the desired position on workpiece surface 22. A screw driver then tightens the screw 40 into the workpiece 22. As the threaded screw 40 reaches the final mounted position, the contacting clip end portion 18 is driven a slight distance to the right, as viewed in FIG. 5, while the lower end termination 16 is driven to the left, as depicted by arrows in FIG. 5, to provide a very tight wedging engagement for wire clip 10.

DESCRIPTION OF SECOND EMBODIMENT

Referring to FIGS. 6–9, there is depicted the second embodiment of this invention. The wire clip 50 for this embodiment is only partially shown, but could be any of a number of conventional wire clip band arrangements, such as depicted in U.S. Pat. No. 3,241,797. Wire clip 50 is preferably formed as a one-piece plastic molded strip 52 having an elongate base portion 53 (partially shown) which can be attached to a workpiece surface 54 by attachment means 56.

Attachment means 56 includes a slot 60 formed through the thickness of base portion 53 and orientated crosswise to the length of base portion 53. By using a slot formation (vis-a-vis a through hole) as the attachment means it permits a very quick and easy fastener arrangement. However, it is essential that screw 62 be maintained in tight engagement with attachment means 56 since it can be readily dislodged from the open end of slot 60 if it becomes loosened.

This invention provides a means of providing a very tight fitting relationship between attachment means 56 and the workpiece 54. Attachment means 56 is constructed in accordance with the principles of this invention by forming along one lateral side of base portion 53 a thickened portion 64 about the open end of slot 60.

Figure 6:
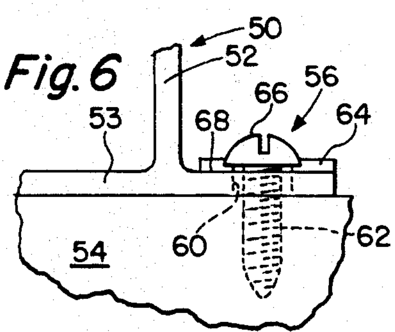
FIG. 6 is a partial front elevational view of a wire clip illustrating the second embodiment of this invention.
Figure 8:
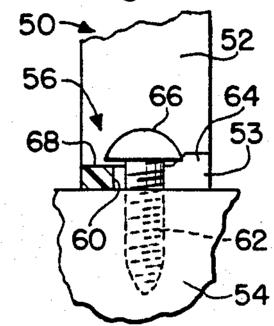
FIG. 8 is a side elevational view taken from the right side of FIG. 6.
Figure 9:
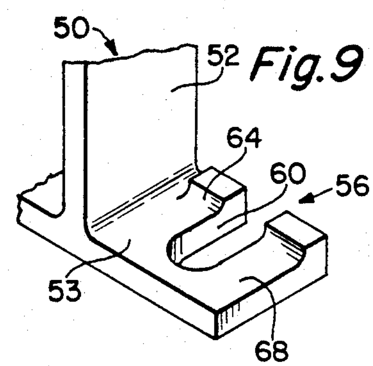
FIG. 9 is a front perspective view depicting the slotted means for attaching a wire clip in the second embodiment.

By virtue of providing thickened portion 64 in the plastic molded base portion 53 about the open end portion 64 of slot 60, the head 66 of screw 62 will first engage the thickened portion 64 as the screw 62 is threaded into workpiece 54. This engagement causes the head 66 to penetrate into the thickened portion 64, as depicted in FIGS. 6 and 8, prior to seating on the generally flat surface 68.

The penetration of head 66 into thickened portion 64 prevents the tendency of base portion 53 to be laterally displaced along slot 60 and prevents the possibility of strip 52 shifting laterally beyond the open end of slot 60 as the head 66 of screw 62 engages generally flat surface 68. Thus, the interaction between head 66 and thickened portion 64 ensures that the screw will consistently and rigidly fasten against the base portion 53 of plastic molded strip 52.

I claim:

1. A wire clip comprising an elongate flexible strip having a longitudinal axis, a first end and a second end, said strip being formed to provide a loop-shaped wire retaining portion and having attachment means for attaching said clip to a workpiece in an installed position; said attachment means comprising first and second wedge-shaped blocks integrally formed respectively in said first and second ends, there being first and second U-shaped slots respectively formed through said first and second wedge-shaped blocks with a bight near a thinner end of each of said blocks and with a channel leading from each of said bights to the respective thicker ends of each of said blocks, the axis of each of said slots being substantially perpendicular to said longitudinal axis, and a pin means for compressively attaching said clip in said installed position; said attachment means being configured to, in said installed position, present complementary uninterrupted sloping faces, from said thicker ends to said thinner ends, in slidable engagement between said first and second wedge-shaped blocks, said first and second U-shaped slots opening toward each other, whereby application of a compressive force by said pin means in installing said clip effects a contineous sliding wedge action between said first and second wedge-shaped blocks urging said bights of said first and second slots against said pin means.

* * * * *